United States Patent
Kraus

(10) Patent No.: US 10,813,291 B2
(45) Date of Patent: Oct. 27, 2020

(54) ROUND BALER HAVING AN ADJUSTABLE WIDTH

(71) Applicant: DEERE & COMPANY, Moline, IL (US)

(72) Inventor: Timothy J. Kraus, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 136 days.

(21) Appl. No.: 16/108,406

(22) Filed: Aug. 22, 2018

(65) Prior Publication Data

US 2019/0098837 A1    Apr. 4, 2019

Related U.S. Application Data

(60) Provisional application No. 62/566,662, filed on Oct. 2, 2017.

(51) Int. Cl.
*A01F 15/08* (2006.01)
*A01F 15/07* (2006.01)

(52) U.S. Cl.
CPC ........ *A01F 15/0833* (2013.01); *A01F 15/071* (2013.01); *A01F 2015/074* (2013.01); *A01F 2015/0795* (2013.01)

(58) Field of Classification Search
CPC .... A01F 15/0833; A01F 15/071; A01F 15/07; A01F 15/0825; A01F 2015/074; A01F 2015/0795; A01F 2015/0755
See application file for complete search history.

(56) References Cited

U.S. PATENT DOCUMENTS

| | | | | |
|---|---|---|---|---|
| 4,212,149 A | * | 7/1980 | Krone | A01F 15/07 100/88 |
| 4,262,478 A | * | 4/1981 | Pentith | A01F 15/07 56/341 |
| 4,334,467 A | * | 6/1982 | Nishibe | A01F 15/07 100/89 |
| 4,910,949 A | * | 3/1990 | Meyer | A01F 15/07 100/88 |
| 6,729,118 B2 | * | 5/2004 | Viaud | A01F 15/0705 100/88 |
| 7,568,425 B2 | * | 8/2009 | Viaud | A01F 15/07 100/87 |
| 9,706,717 B2 | * | 7/2017 | Chapon | A01F 15/085 |
| 2003/0029329 A1 | | 2/2003 | Viaud | |
| 2008/0223013 A1 | * | 9/2008 | Viaud | A01F 15/0883 56/341 |

* cited by examiner

*Primary Examiner* — Robert E Pezzuto
*Assistant Examiner* — Adam J Behrens

(57) ABSTRACT

A round baler may include a frame supported by one or more ground engaging devices, a bale forming chamber including sidewalls spaced apart a distance defining a width of the bale forming chamber, a discharge gate selectively operable between a baling position and a discharge position, and a bale forming apparatus, which forms the round bale in the bale forming chamber. The round baler may include a first set of spacers positioned adjacent at least one of the sidewalls reducing the effective width of the bale forming chamber.

19 Claims, 9 Drawing Sheets

US 10,813,291 B2

ROUND BALER HAVING AN ADJUSTABLE WIDTH

CROSS-REFERENCE TO RELATED APPLICATIONS

This application claims the benefit of U.S. Provisional Application No. 62/566,662, titled A ROUND BALER HAVING AN ADJUSTABLE WIDTH, filed Oct. 2, 2017, which is hereby incorporated by reference in its entirety.

FIELD OF THE DISCLOSURE

The present disclosure relates to a round baler having an adjustable width bale forming chamber.

BACKGROUND

Agricultural balers gather, compress, and shape crop material into a bale. Agricultural round balers gather crop material into a bale forming chamber and shape the crop material into a cylindrical bale. The round baler then wraps the bale with twine, wrap, or netting. The round baler ejects the wrapped bale from the bale forming chamber by opening a rear door allowing the bale to exit. There is a need to be able to adjust the effective width of the bale forming chamber and the resulting round bale.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure includes a system, which effectively reduces the width of a bale forming chamber of a round baler.

According to an aspect of the present disclosure, a round baler may include a frame supported by one or more ground engaging devices, a bale forming chamber including first and second sidewalls connected to the frame, the first and second sidewalls spaced apart a distance defining a width of the bale forming chamber, a discharge gate selectively operable between a baling position and a discharge position, and a bale forming apparatus including one or more rollers, one or more belts, and one or more tensioner arms, which form the round bale in the bale forming chamber. The round baler may also include a first set of spacers positioned adjacent at least one of the first and second sidewalls effectively reducing the width of the bale forming chamber.

According to an aspect of the present disclosure, a method of adjusting the width of a bale forming chamber for a round baler may include reducing a width of the bale forming chamber by positioning a first set of spacers adjacent at least one of first and second sidewalls of the bale forming chamber.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

Figure 1:
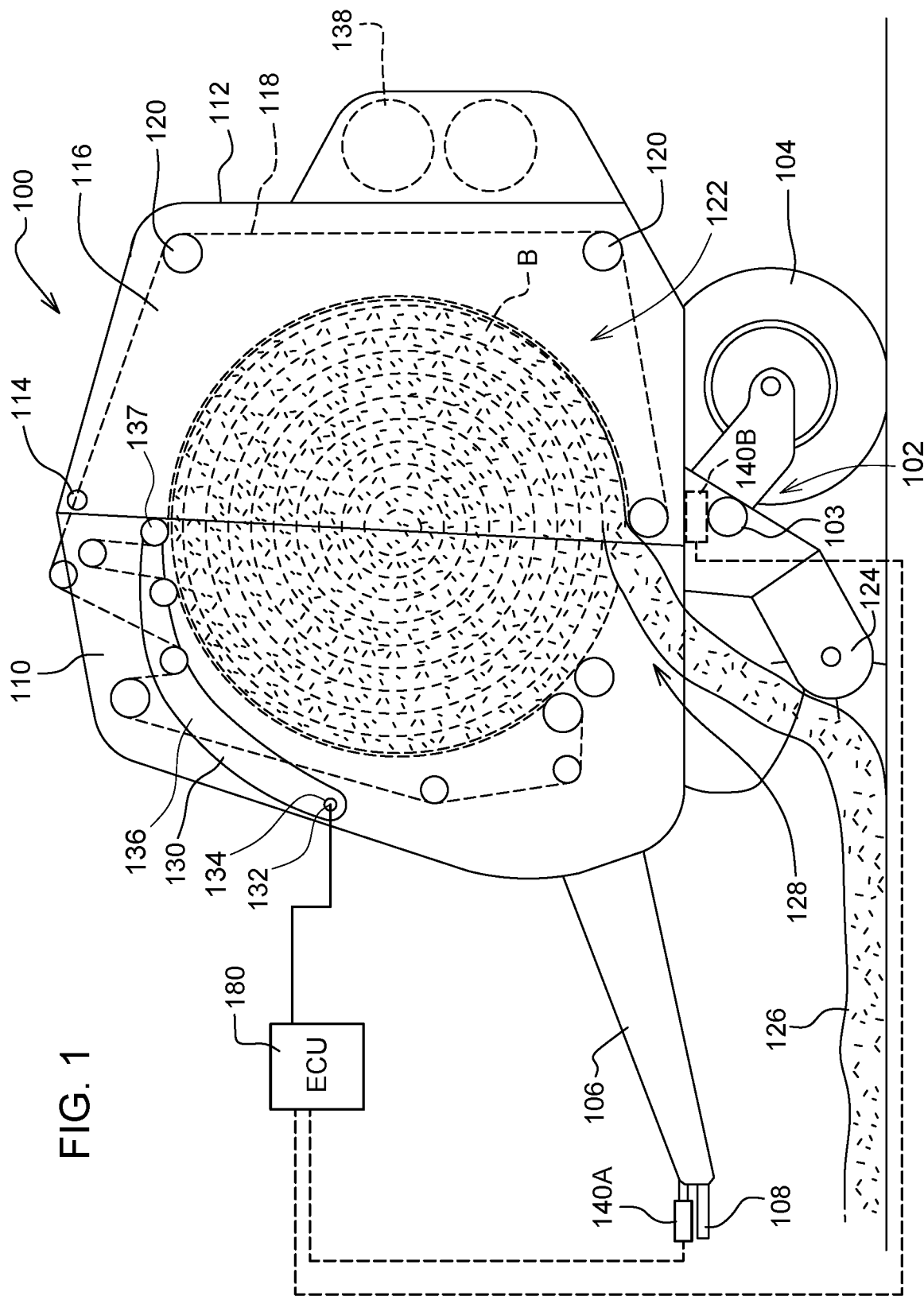
FIG. 1 is a side cutaway view of an agricultural harvesting machine.

FIG. 1 illustrates an agricultural harvesting machine 100, such as a baler, according to one embodiment. Although a round baler is shown, this disclosure also applies to other balers and harvesting machines. The agricultural harvesting machine 100 may be coupled to an agricultural vehicle, such as a tractor, which provides power to the agricultural harvesting machine 100 or the agricultural harvesting machine 100 may be self-propelled. The agricultural harvesting machine 100 may be combined or integrated with a cotton harvester, a combine, or other harvesting machines. For ease of reference, the remaining description will refer to the agricultural harvesting machine 100 as a baler. The baler 100 may include an electronic control unit 180, or ECU, having one or more microprocessor-based electronic control units or controllers, which perform calculations and comparisons and execute instructions. The ECU 180 may include a processor, a core, volatile and non-volatile memory, digital and analog inputs, and digital and analog outputs. The ECU 180 may connect to and communicate with various input and output devices including, but not limited to, switches, relays, solenoids, actuators, light emitting diodes (LED's), liquid crystal displays (LCD's) and other types of displays, radio frequency devices (RFD's), sensors, and other controllers. The ECU 180 may receive communication or signals, via electrically or any suitable electromagnetic communication, from one or more devices, determine an appropriate response or action, and send communication or signals to one or more devices. The ECU 180 can be a programmable logic controller, also known as a PLC or programmable controller. The ECU 180 may connect to a baler 100 electronic control system through a data bus, such as a CAN bus, or the ECU 180 can be a part of the baler 100 electronic control system. The ECU 180 is provided for electronically controlling and monitoring a number of functions of the baler 100. For example, the ECU 180 can be configured to monitor bale size, trigger a twine or wrapping cycle, open and close the discharge gate, initiate bale discharge, control the application of preservative to the bale, and communicate crop moisture content and other bale related information to the operator.

Figure 2:
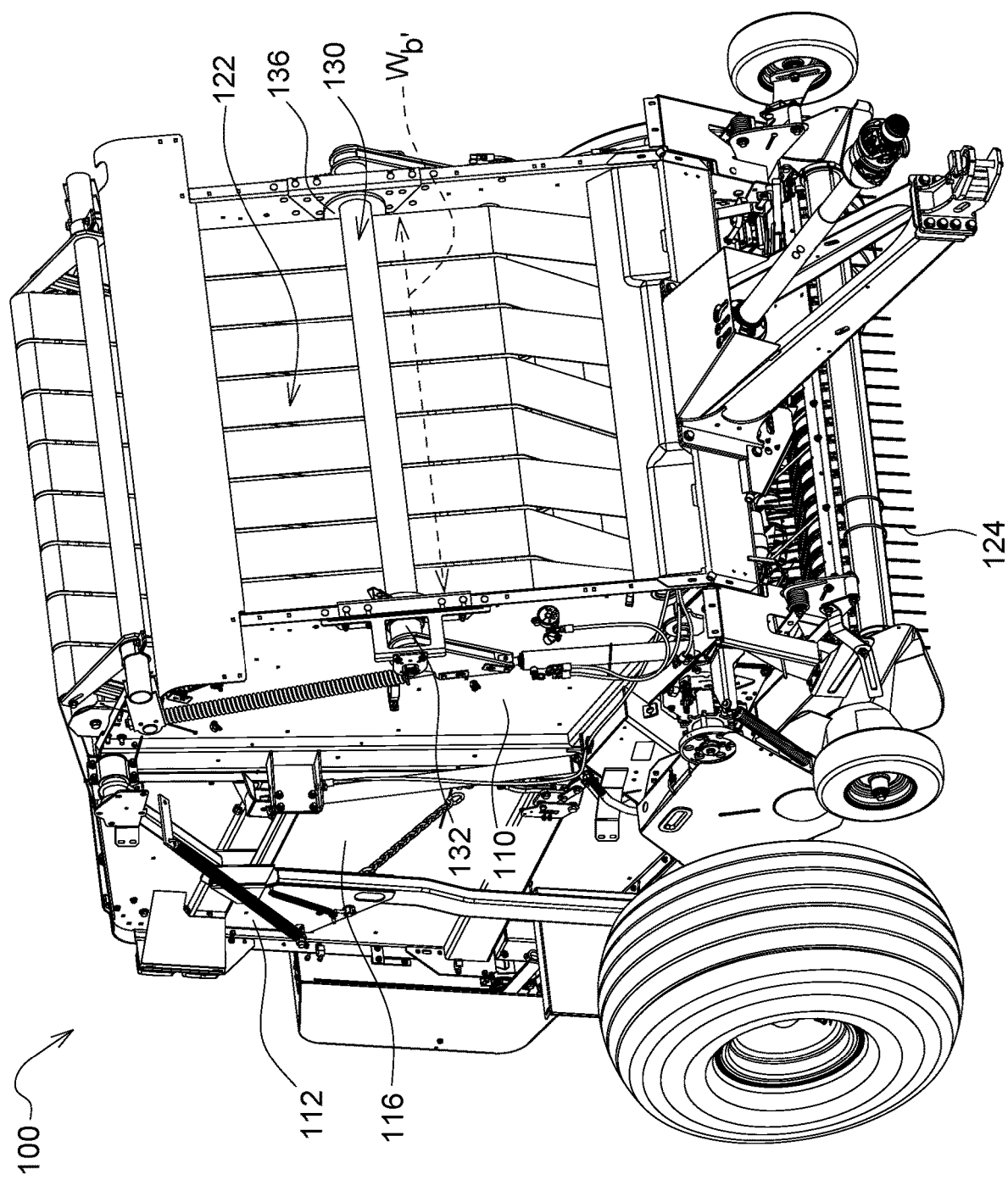
FIG. 2 is a front perspective view of an agricultural harvesting machine, according to one embodiment.
Figure 3:
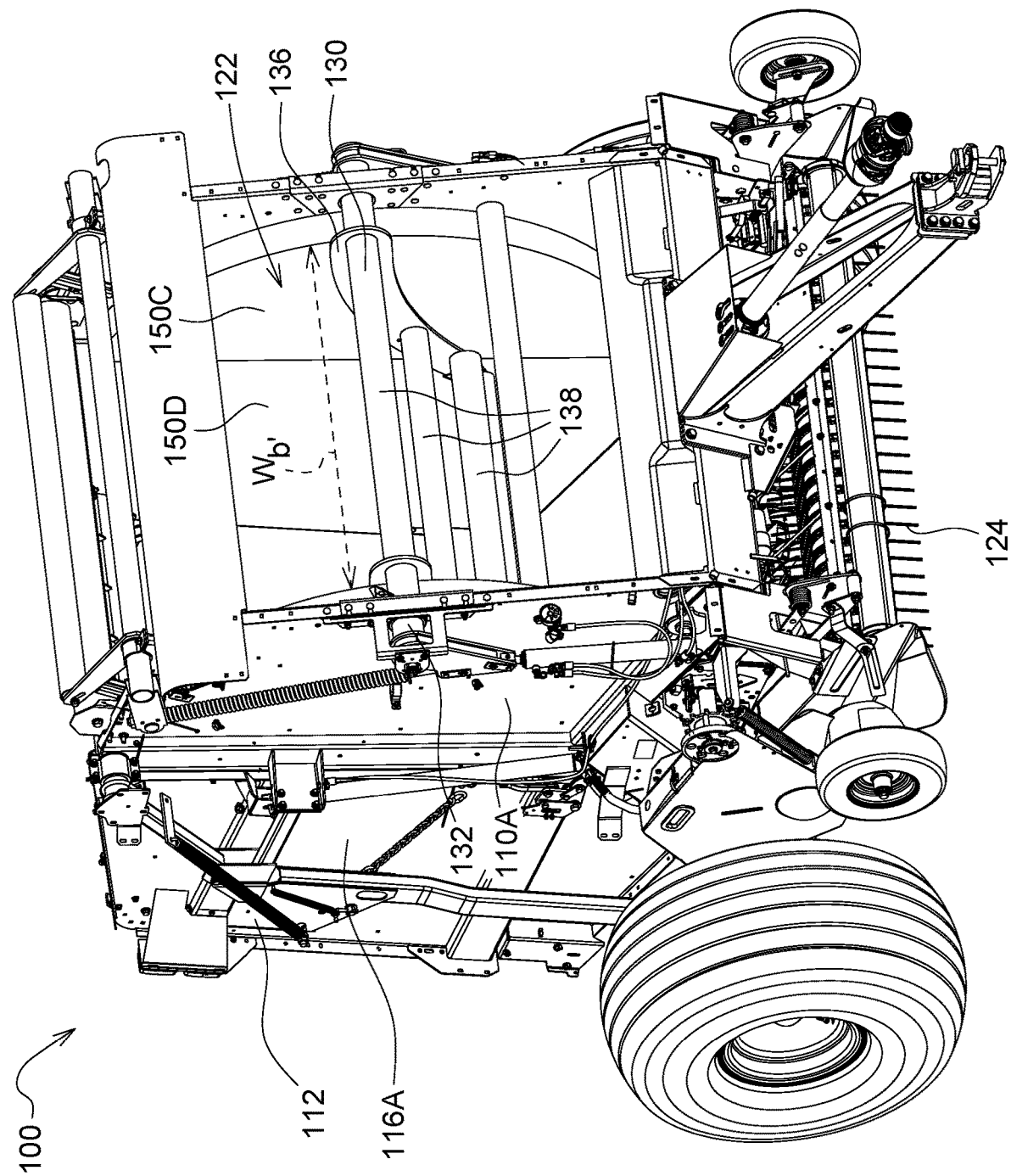
FIG. 3 is a front perspective view of an agricultural harvesting machine, according to one embodiment.
Figure 4:
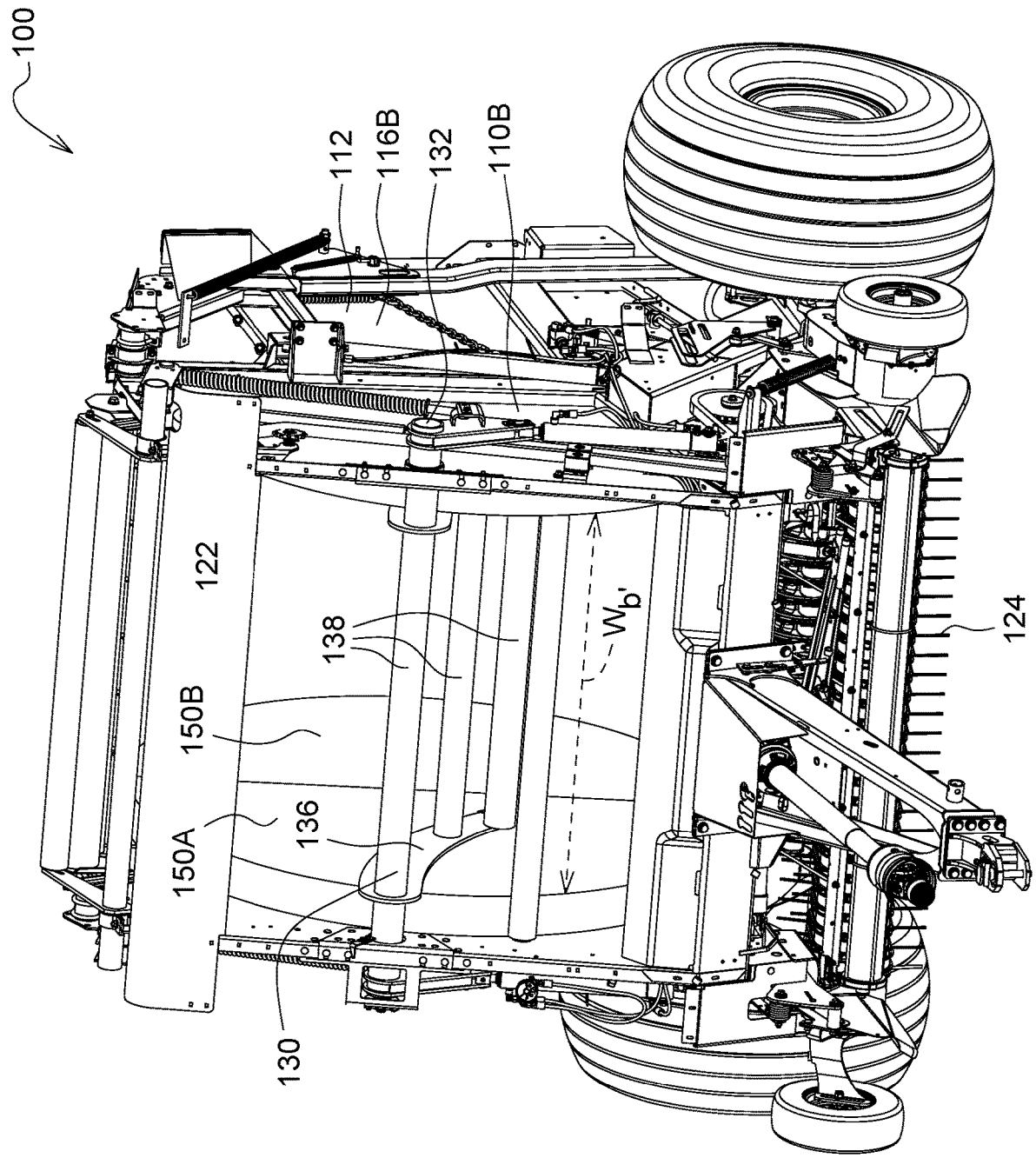
FIG. 4 is a front perspective view of an agricultural harvesting machine, according to one embodiment.
Figure 5B:
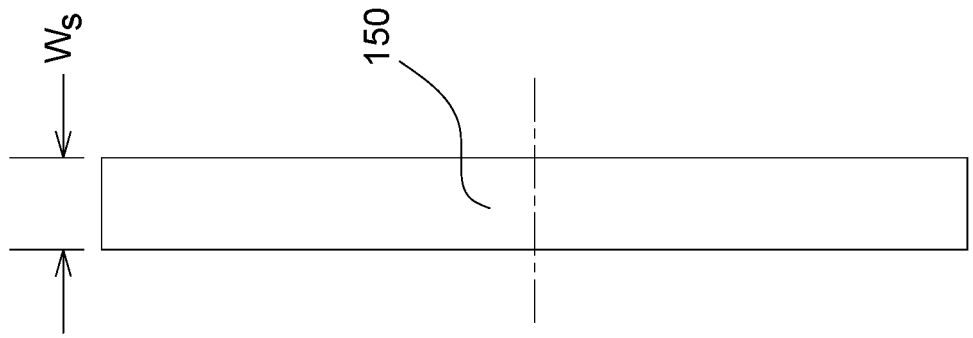
FIG. 5B is a schematic side view of a spacer, according to one embodiment.
Figure 5A:
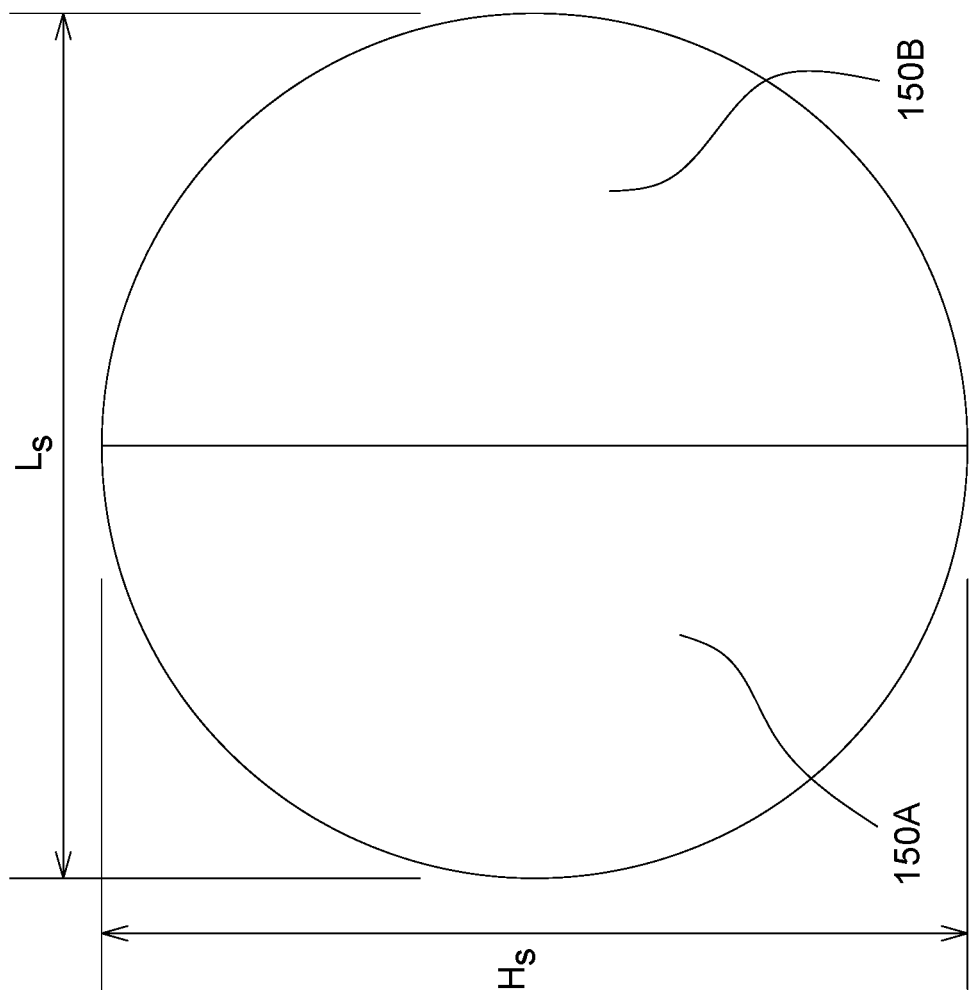
FIG. 5A is a schematic front view of a spacer, according to one embodiment.

With reference to FIGS. 1 and 2, the baler 100 may move across a field and gather and process crop material to form a crop package, such as a bale B. The baler 100 may then eject the bale B from the rear of the baler 100. The baler 100 can include a frame 102 supported on one or more ground engaging devices or wheels 104. The baler 100 can include a draft tongue 106 coupled to the frame 102 at one end with a hitch arrangement 108 at the other end configured to couple the baler 100 to an agricultural vehicle (not shown). The baler 100 can include a pair of side walls 110 fixed to the frame 102. The baler 100 can include a discharge gate 112 pivotally mounted about a pivot arrangement 114. The discharge gate 112 can include a pair of side walls 116. The discharge gate 112 is selectively operable for moving between a lowered baling position and an opened discharge position. As depicted, the baler 100 is of variable size chamber bales including a plurality of longitudinally extending side-by-side belts 118 supported on a plurality of rollers 120. A bale forming chamber 122 is defined at least in part by the pair of baler, or bale forming chamber, side walls 110, the pair of discharge gate side walls 116, the rollers 120, and the belts 118. The distance between the left and right baler side walls 110, and the left and right discharge gate sidewalls 116, defines the width $W_b$ of the round bale B. (Left and right directions are described in relation to the forward direction of travel of the baler 100.)

As the baler 100 moves through a field, a pickup mechanism 124 feeds crop material 126 from the ground surface into a crop inlet 128 of the bale forming chamber 122, which rolls the crop material 38 in spiral fashion into a cylindrical bale B. The pick-up mechanism 124 may include various pick-up apparatus including, but not limited to, tines, forks, augers, conveyors, baffles, a cutter or pre-cutter assembly, or any combination of the preceding. A belt tensioning device 130 maintains the appropriate tension in the belts 118. The belt tensioning device 130 rotates around pivot 132 as the bale B increases in size. The position of the belt tensioning device 130 provides an indication of bale size. A bale dimension sensor 134 (e.g., potentiometer) can be coupled to the pivot point 132 of the tensioning device 130 and can provide an electrical signal correlating with the size of the bale (e.g., diameter) to the Electronic Control Unit (ECU) 180. When the bale B attains a predetermined size, the baler 100 wraps the bale B with twine, net wrap, or other appropriate wrapping material from a wrapping arrangement 138. The baler 100 then discharges the bale B by opening the discharge gate 112, for example by actuation of gate cylinders, which permits the completed bale B to be discharged from the baler 100 onto the ground or an accumulator. The belt tensioning device 130 may include a pair of belt tensioner arms 136 and one or more tensioner rolls or rollers 137 positioned between the belt tensioner arms 136.

With continuing reference to FIGS. 1 and 2, the baler 100 can include one or more load or force sensors 140 (e.g., load cell) for sensing a weight of the bale B during and after bale formation in the bale forming chamber 122. The baler 100 can include a load cell 140A on the tongue 106 adjacent to the hitch 108. The baler 100 can also include one or more load cells 140B positioned between the baler frame 102 and the axle 103. The load cells 140 can produce a signal varying with their deflection, thereby providing an indication of bale weight.

With reference to FIGS. 3-6, the baler 100 can include one or more spacers 150 to reduce or decrease the width $W_{b'}$ of the bale forming chamber 122. The one or more spacers 150 can be positioned adjacent to the baler, or bale forming chamber, sidewalls 110, the discharge gate side walls 116, or both. The one or more spacers 150 can be connected or attached to one or more of the side walls 110, 116, in any combination. The spacer 150 can be formed of one or more individual, separate, or integral spacers. With reference to FIG. 5A, the spacer 150 can be single or multiple components. When the spacer 150 is a single component, the spacer 150 can be attached to either the baler sidewall 110 or the discharge gate sidewall 116. When the spacer 150 is multiple components, a first portion or component of the spacer 150 can be attached to the baler sidewall 110 and a second portion or component of the spacer 150 can be attached to the discharge gate sidewall 116.

According to one implementation, a first spacer 150 is positioned adjacent the right baler sidewall 110A and a second spacer 150 is positioned adjacent the left baler sidewall 110B. The first and second spacers 150, 150 can each cover a majority or most of the respective sidewalls 110A, 110B. The spacer 150 has a width $W_s$, a height $H_s$, and a length $L_s$ sized appropriately to form and support the sides of a full size or completed round bale B in the bale forming chamber 122. The spacer 150 can have a generally rounded or circular shape corresponding to the round bale B. The height $H_s$ and length $L_s$ of the spacer 150 can be smaller, larger, or similar in size to the diameter of the completed round bale B. The width of the bale forming chamber 122, and thus the resulting bale B, can be adjusted by using one or more spacers 150. The width $W_b$ of the bale forming chamber 122 can be reduced or decreased by the width $W_s$ of the one or more spacers 150 to the smaller width $W_{b'}$. In one example embodiment, the width $W_b$ of the bale forming chamber 122 can be reduced to the smaller width $W_{b'}$ by the width $W_s$ of one spacer 150 positioned on either the left or right side of the bale forming chamber 122. In another example embodiment, the width $W_b$ of the bale forming chamber 122 can be reduced to the smaller width $W_{b'}$ by the widths $W_s$ of spacers 150 positioned on both the left or right sides of the bale forming chamber 122. The spacers 150 positioned on the right and left sides of the bale forming chamber 122 can have the same width or different widths $W_{b'}$.

According to another implementation, a first spacer 150A is positioned adjacent the right baler sidewall 110A, a second spacer 150B is positioned adjacent the right discharge gate sidewall 116A, a third spacer 150C is positioned adjacent the left baler sidewall 110B, and a fourth spacer 150D is positioned adjacent the left discharge gate sidewall 116B. The first and second spacers 150A, 150B can form a substantially continuous spacer 150 when the discharge gate 112 is closed. When the discharge gate 112 is open, the first spacer 150A can remain adjacent with the baler side wall 110A and the second spacer 150B can remain adjacent with the discharge gate side wall 116A. The spacers 150A, 150B can be a similar or the same size and shape.

Figure 6:
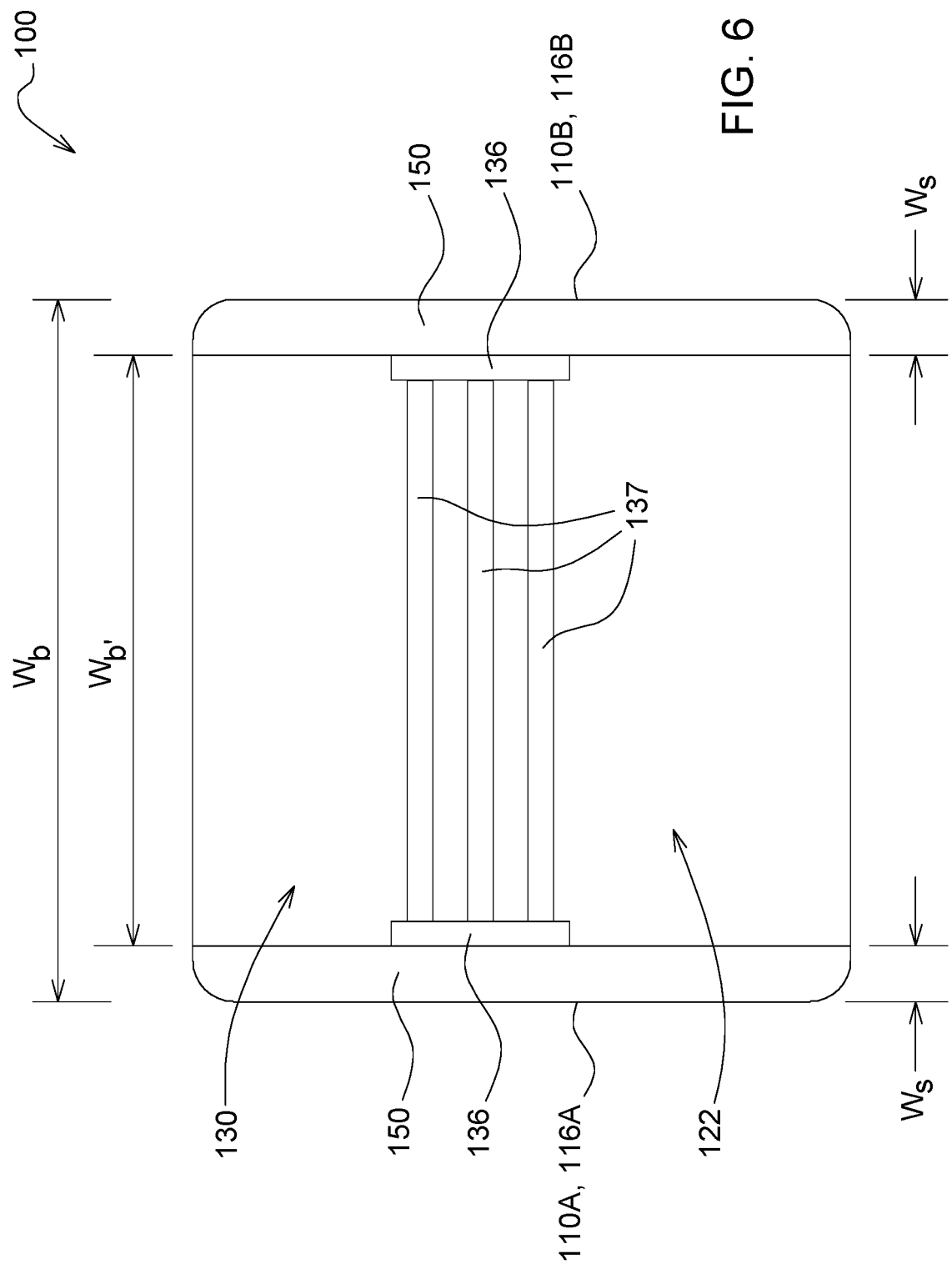
FIG. 6 is a schematic front view of an agricultural harvesting machine showing the position of the one or more spacers, according to one embodiment.
Figure 7:
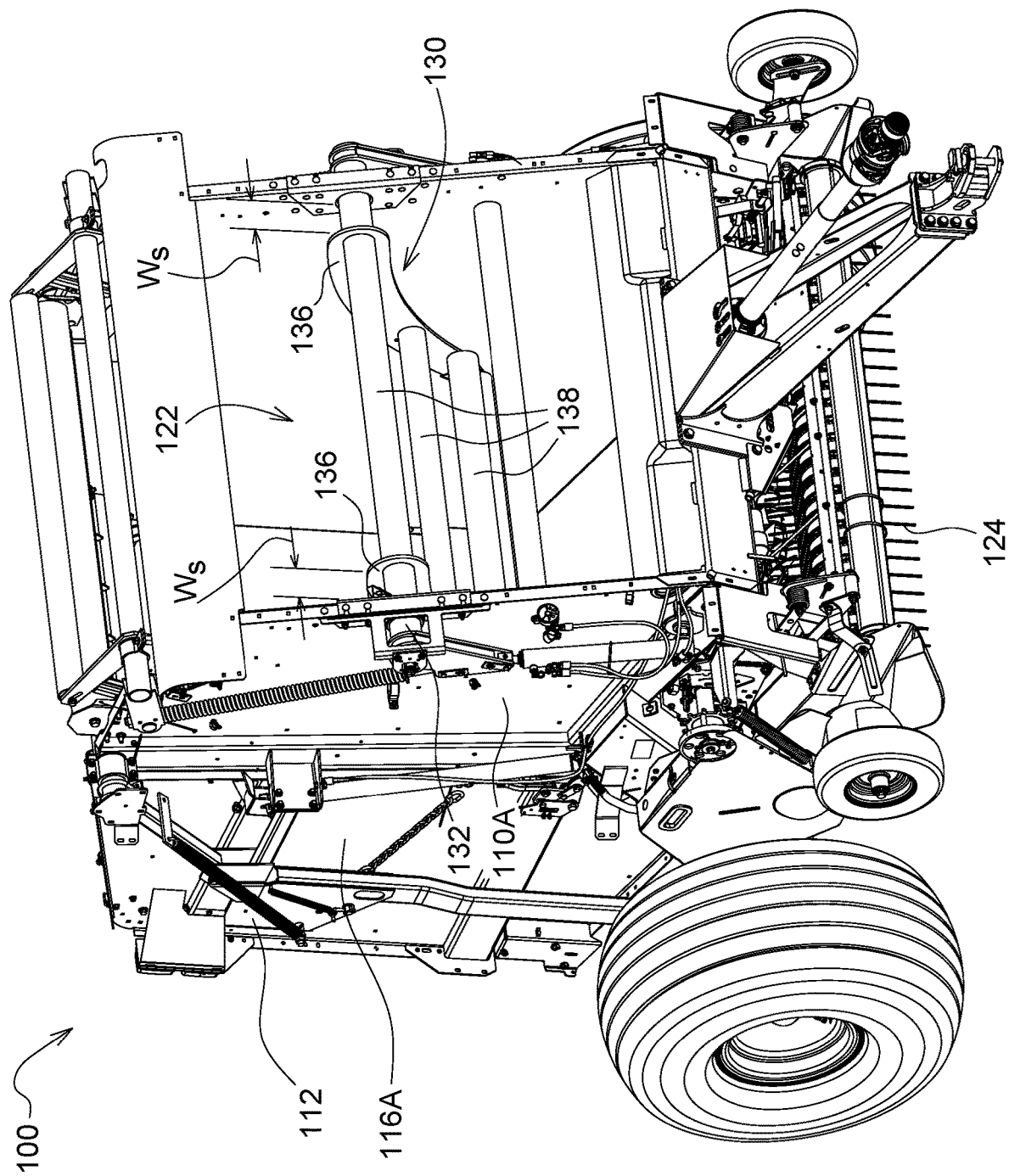
FIG. 7 is a front perspective view of an agricultural harvesting machine, according to one embodiment.

With reference to FIGS. 6-7, the belt tensioning device 130 may need repositioned due to the addition of one or more spacers 150 in the bale forming chamber 122. The belt tensioning device 130 may include two belt tensioner arms 136, with one positioned adjacent the right baler side wall 110A and the other positioned adjacent the left baler side wall 110B. With the inclusion of the one or more spacers 150, each of the belt tensioner arms 136 can be moved inward the width $W_s$ of the spacer 150. The tensioner rollers 137 positioned between the belt tensioner arms 136 may need resized, or shortened, to account for the smaller distance between the two belt tensioner arms 136. The rollers 137 could be sized to be used with or without spacers 150 or they could be adjustable.

Figure 8:
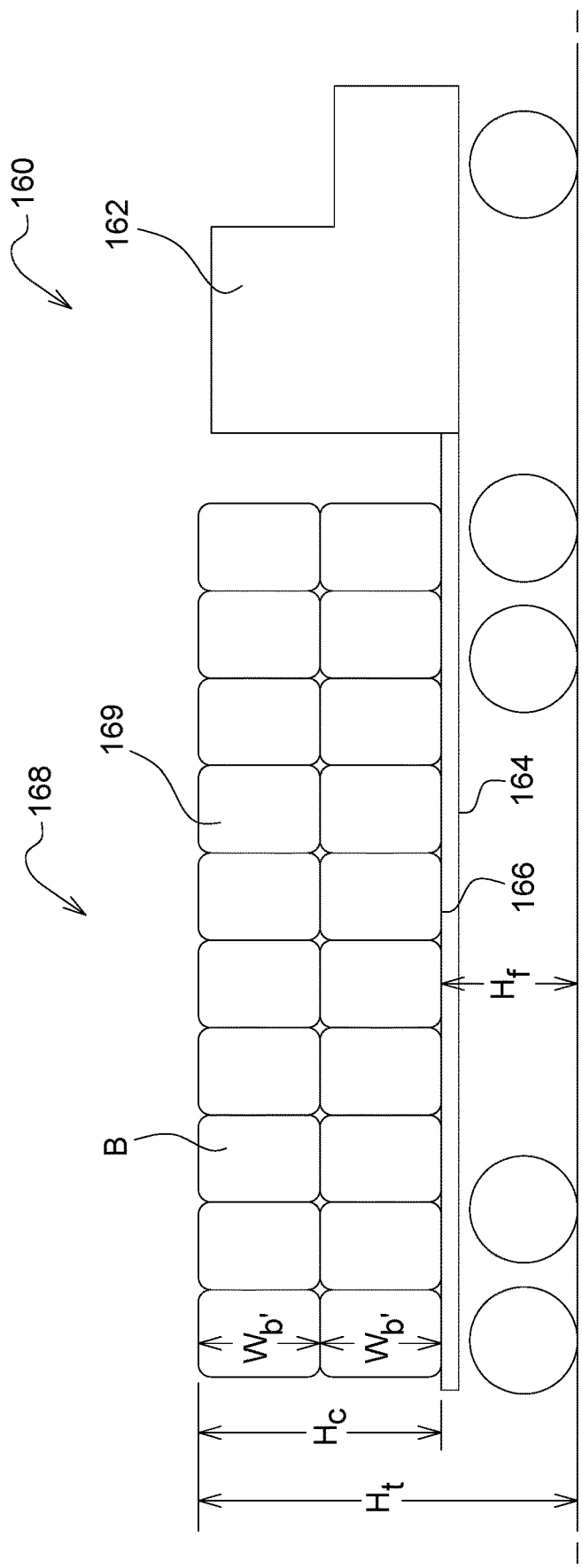
FIG. 8 is a schematic view of a transportation system for round bales, according to one embodiment.

With reference to FIG. 8, a transportation system 160 may include a tractor unit 162 and a trailer 164 transporting cargo 168. The transportation system 160 may be subject to various rules and regulations regarding the maximum height, length, width, weight, and other dimensions and attributes. The bed or floor 166 of the trailer 164 is position a height $H_f$ from the ground or transportation surface. The cargo 168 on the trailer 164 may be limited to an overall maximum height $H_t$. The resulting maximum allowable height $H_c$ of the cargo 168 on the trailer 164 is the difference between the height $H_f$ of the trailer floor 166 and the overall maximum height $H_t$. To maximize the amount of cargo 168 on the trailer 164, the cargo 168 should extend from the floor 166 up to or near the overall maximum height $H_t$. When the cargo 168 is in discretely sized packages or containers 169, the packages 169 should be sized to maximize or utilize the entire available cargo height $H_c$. The packages 169 should be sized so that multiple integers of the packages is at or near the maximum height $H_c$ of the cargo 168. For example, the packages should be sized so that one, two, or three, etc. packages 169 can be stacked and be at or near the overall maximum height $H_t$. Stated differently, the maximum height $H_c$ of the cargo 168 divided by the height of each individual package 169 should equal an integer or whole number (e.g., 1, 2, 3, etc.). The height of each individual package 169 can be adjusted so that the number of packages is a whole number.

The packages 169 can be bales B stacked on their sides with the width $W_{b'}$ of the bale B extending in the vertical direction from the floor 166 of the trailer 164 to the overall maximum height $H_t$. The width $W_{b'}$ of the bale B is selected based upon the available cargo height $H_c$ so that a whole number of bales utilizes the entire available cargo height $H_c$ without exceeding the overall maximum height $H_t$. As shown in this embodiment, the width $W_{b'}$ of the bale is selected so that two bales can be stacked on their sides maximizing the use of the entire available cargo height $H_c$ without exceeding the overall maximum height $H_t$. In one example, the overall maximum height $H_t$ is 162 inches (411.5 cm) and the height $H_f$ of the trailer floor 166 is 48 inches (121.9 cm), resulting in an available cargo height $H_c$ of 114 inches (289.5 cm). The bale width $W_{b'}$ is selected to be 56 inches (142.2 cm) so that two bales utilize the available cargo height $H_c$ of 114 inches (289.5 cm) without exceeding the overall maximum height $H_t$ of 162 inches (411.5 cm). This bale width $W_{b'}$ was selected because one of the standard bales widths is 61 inches (154.9 cm) and this size minimizes the width $W_s$ of the spacer 150.

Figure 9:
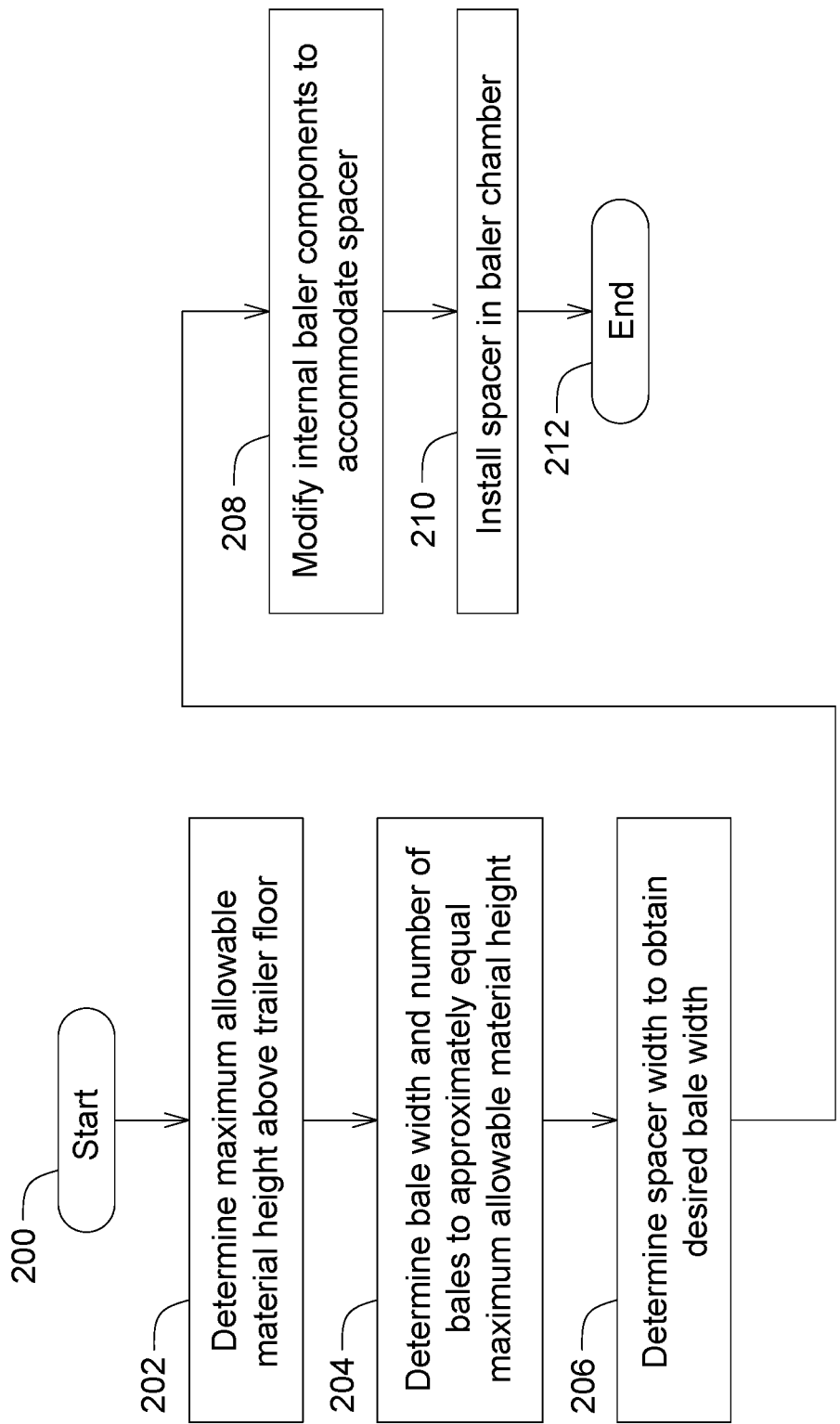
FIG. 9 is a flow chart for a method of adjusting the effective width of a bale forming chamber of a round baler, according to one embodiment.

FIG. 9 illustrates a method of adjusting the effective width of a bale forming chamber in a round baler, which may be implemented in one or more of the embodiments described herein and depicted in the various FIGURES. At step 200, the method starts.

At step 202, the available cargo height $H_c$ of a transportation system 160 is determined. This can be determined by subtracting the height $H_f$ of the trailer floor 166 from the overall maximum height $H_t$.

At step 204, the bale width $W_{b'}$ is determined, which maximizes the available cargo height $H_c$ without exceeding the overall maximum height $H_t$. This can be determined by dividing the available cargo height $H_c$ by the appropriate number of bales so that the required bale width $W_{b'}$ is near, or slightly smaller, than an existing bale width $W_b$. This will minimize the required width $W_s$ of the spacer 150.

At step 206, the required width $W_s$ of the spacer 150 is determined to obtain the desired bale width $W_{b'}$. One or more spacers 150 can be used and the right and left spacers 150 can be the same or different widths $W_s$.

At step 208, the internal baler components, such as the belt tensioner arm 136 and tensioner rollers 137, are modified to accommodate the one or more spacers 150. These internal baler components are moved inward within the bale forming chamber 122 to allow the one or more spacers 150 to be positioned adjacent the side walls 110, 116.

At step 210, the one or more spacers 150 are installed in the bale forming chamber 122 effectively reducing the width $W_{b'}$ of the bale forming chamber 122 and the resulting bale B.

At step 212, adjusting the width of a bale forming chamber in a round baler has occurred, according to one embodiment. In other embodiments, one or more of these steps or operations may be omitted, repeated, or re-ordered and still achieve the desired results.

The systems and methods disclosed herein can be used with various round bale recompression systems, such as those in patent application titled SYSTEM AND METHOD FOR RECOMPRESSING ROUND BALES INTO SQUARE BALES, 62/566,717, concurrently filed with this application, which is hereby incorporated by reference.

Without in any way limiting the scope, interpretation, or application of the claims appearing below, a technical effect of one or more of the example embodiments disclosed herein is the adjustment of the width of a bale forming chamber of a round baler. Another technical effect of one or more of the example embodiments disclosed herein is the modification of a standard width round baler to reduce the effective width of the resulting round bale. Another technical effect of one or more of the example embodiments disclosed herein is the use of internal wall spacers to reduce the effective width of the bale forming chamber and the resulting round bale.

The terminology used herein is for the purpose of describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

The references "A" and "B" used with reference numerals herein are merely for clarification when describing multiple implementations of an apparatus.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. A round baler comprising:
   a frame supported by at least one ground engaging devices;
   a bale forming chamber including first and second sidewalls connected to the frame, the first and second sidewalls spaced apart a distance defining a width of the bale forming chamber;
   a discharge gate selectively operable between a baling position and a discharge position;
   a bale forming apparatus operable to form a round bale in the bale forming chamber, the bale forming apparatus including a plurality of rollers supporting at least one belt, and at least one tensioner arm supporting at least one of the plurality of rollers and moveable to adjust a diametric size of the bale forming chamber to maintain a tension in the at least one belt;
   a first set of spacers positioned adjacent at least one of the first and second sidewalls reducing the width of the bale forming chamber; and
   wherein at least one of the plurality of rollers is adjustable to accommodate multiple widths of the baling forming chamber.

2. The round baler of claim 1, wherein the first set of spacers comprises a first spacer adjacent the first sidewall.

3. The round baler of claim 1, wherein the first set of spacers comprises a first spacer adjacent the first sidewall and a second spacer adjacent the second sidewall.

4. The round baler of claim 3, wherein the first spacer covers a majority of the first sidewall and the second spacer covers a majority of the second sidewall.

5. The round baler of claim 1, wherein the discharge gate includes first and second sides spaced apart a distance, the discharge gate further comprising a second set of spacers adjacent at least one of the first and second sides reducing a width of the bale forming chamber.

6. The round baler of claim 5, wherein the second set of spacers comprises a first spacer adjacent the first side of the discharge gate.

7. The round baler of claim 5, wherein the second set of spacers comprises a first spacer adjacent the first side of the discharge gate and a second spacer adjacent the second side of the discharge gate.

8. The round baler of claim 5, wherein the first and second set of spacers have an equal width.

9. The round baler of claim 1, wherein the at least one tensioner arm is repositionable from being adjacent one of the first and second sidewalls to being adjacent the first set of spacers.

10. The round baler of claim 1, wherein the width of the first set of spacers is sized to reduce the width of the bale forming chamber and the resulting bale so that the width of the bale corresponds to a desired shipping height.

11. A method of adjusting the width of a bale forming chamber for a round baler comprising:
    determining a desired bale width;
    determining a width of a first set of spacers;
    reducing a width of the bale forming chamber by positioning a first set of spacers adjacent at least one of first and second sidewalls of the bale forming chamber; and
    repositioning at least one tensioner arm from being adjacent one of the first and second sidewalls to being adjacent the first set of spacers.

12. The method of claim 11, wherein the first set of spacers comprises a first spacer adjacent the first sidewall.

13. The method of claim 11, wherein the first set of spacers comprises a first spacer adjacent the first sidewall and a second spacer adjacent the second sidewall.

14. The method of claim 13, wherein the first spacer covers a majority of the first sidewall and the second spacer covers a majority of the second sidewall.

15. The method of claim 11, further comprising:
    reducing a width of the bale forming chamber by positioning a second set of spacers adjacent at least one of first and second sides of a discharge gate reducing a width of the bale forming chamber.

16. The method of claim 15, wherein the second set of spacers comprises a first spacer adjacent the first side of the discharge gate.

17. The method of claim 15, wherein the second set of spacers comprises a first spacer adjacent the first side of the discharge gate and a second spacer adjacent the second side of the discharge gate.

18. The method of claim 15, wherein the first and second set of spacers have an equal width.

19. The method of claim 11, wherein the width of the first set of spacers is sized to reduce the width of the bale forming chamber and a resulting bale to a desired shipping height.

* * * * *